US012593756B2

(12) United States Patent
Horstmann

(10) Patent No.: US 12,593,756 B2
(45) Date of Patent: Apr. 7, 2026

(54) ROUND BALER

(71) Applicant: Maschinenfabrik Bernard Krone GmbH & Co. KG, Spelle (DE)

(72) Inventor: Josef Horstmann, Ibbenbüren (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 428 days.

(21) Appl. No.: 18/321,419

(22) Filed: May 22, 2023

(65) Prior Publication Data

US 2023/0371437 A1    Nov. 23, 2023

(30) Foreign Application Priority Data

May 23, 2022    (DE) .................... DE 102022112955.1

(51) Int. Cl.
*A01F 15/10*    (2006.01)
*A01F 15/07*    (2006.01)

(52) U.S. Cl.
CPC ........ *A01F 15/106* (2013.01); *A01F 15/0705* (2013.01)

(58) Field of Classification Search
CPC .. A01D 15/106; A01D 15/0705; A01D 15/10; A01D 2015/102; A01F 15/106;

(Continued)

(56) References Cited

U.S. PATENT DOCUMENTS 4,057,954 A * 11/1977 Mast ................... A01F 15/0705
                                            100/88
4,510,861 A * 4/1985 Campbell ........... A01F 15/0705
                                            100/88

(Continued)

FOREIGN PATENT DOCUMENTS

DE          3437294 A  * 10/1984    ......... A01F 15/0705
DE     19932336 A1      1/2001

(Continued)

OTHER PUBLICATIONS

European Search Report from Patent Application No. EP23174845.0, mailed Oct. 24, 2023, 7 pages.

*Primary Examiner* — Joseph M Rocca
*Assistant Examiner* — Sunny D Webb
(74) *Attorney, Agent, or Firm* — McKee, Voorhees & Sease, PLC

(57)          ABSTRACT

A round baler (1) that includes a feed channel (6) leading to a pressing chamber (55), a drivable transfer device (20) to convey harvested material through the feed channel (6) toward the pressing chamber (55) in a pressing mode, as well as a storage device (30) with a storage space (32). There is a means to continuously pick up harvested material, and a storage device (30) has a storage space wall (31) which outwardly delimits the storage space (32), in communication with the feed channel (6) by means of at least one storage space opening (33), as well as a drivable storage space conveyor (34) for the harvested material within the storage space (32), wherein, in storage mode, the storage device (30) intakes harvested material from the feed channel (6) and, in the pressing mode, discharges harvested material to the feed channel (6) both with a storage space opening(s) (33).

14 Claims, 5 Drawing Sheets

(58) Field of Classification Search
CPC . A01F 15/0705; A01F 15/10; A01F 2015/102
USPC .......................................... 100/6, 40; 56/341
See application file for complete search history.

(56) References Cited

U.S. PATENT DOCUMENTS

| | | | | |
|---|---|---|---|---|
| 4,914,900 | A  * | 4/1990 | Viaud ................. | A01F 15/0705 |
| | | | | 100/88 |
| 6,886,312 | B1 * | 5/2005 | Inman .................. | A01F 25/183 |
| | | | | 53/529 |
| 7,409,814 | B2 * | 8/2008 | Hood ................. | A01F 15/0715 |
| | | | | 53/399 |
| 7,867,072 | B2 * | 1/2011 | Lauwers ............... | A01D 90/04 |
| | | | | 460/112 |
| 8,205,424 | B1 * | 6/2012 | Lang ....................... | A01F 29/02 |
| | | | | 56/341 |
| 8,656,831 | B2 * | 2/2014 | Viaud ................ | A01F 15/0705 |
| | | | | 100/88 |
| 9,144,200 | B2 * | 9/2015 | Chaney .................. | A01D 90/04 |
| 10,076,081 | B2 * | 9/2018 | Verhaeghe ............ | A01F 15/046 |
| 10,462,974 | B2 * | 11/2019 | Schinstock ............. | A01F 15/10 |
| 11,259,467 | B1 * | 3/2022 | Pramod ................ | A01F 15/071 |
| 11,576,308 | B2 * | 2/2023 | Peterson .............. | A01D 41/127 |

FOREIGN PATENT DOCUMENTS

| | | | | | |
|---|---|---|---|---|---|
| DE | 102005020777 | A1 | 11/2006 | | |
| DE | 102018003709 | A1 | 8/2019 | | |
| EP | 0350514 | A1 | 1/1990 | | |
| EP | 2220929 | A1 * | 8/2010 | .......... | A01F 15/106 |
| EP | 2196082 | B1 | 2/2013 | | |
| EP | 2556744 | A1 | 2/2013 | | |
| GB | 2189123 | A  * | 10/1987 | .......... | A01F 29/005 |
| WO | WO-2013014291 | A1 * | 1/2013 | ......... | A01F 15/0705 |

* cited by examiner

ROUND BALER

CROSS REFERENCE TO RELATED APPLICATIONS

This application claims priority under 35 U.S.C. § 119 to German Patent Application DE 10 2022 112 955.1, filed May 23, 2022, which is herein incorporated by reference in its entirety, including without limitation, the specification, claims, and abstract, as well as any figures, tables, appendices, or drawings thereof.

FIELD OF THE INVENTION

The present invention relates to improved means which enable a round baler to have a continuous intake of harvested material.

BACKGROUND OF THE INVENTION

The background description provided herein gives context for the present disclosure. Work of the presently named inventors and aspects of the description that may not otherwise qualify as prior art at the time of filing are neither expressly nor impliedly admitted as prior art.

Round balers are used in agriculture to pick up harvested material, such as hay or straw, and compress it into bales. The harvested material is picked up from the ground (for example, by a pick-up baler), conveyed further, normally comminuted (for example, by means of a cutting rotor), and finally compressed into round bales of harvested material in a pressing chamber. Therefore, pressing elements act on the harvested material, which also act as conveying elements and create a revolving conveyance of the harvested material. The finished bale is wrapped with a binding material in a binding process. Twine, netting, or (for example, in the case of grass) film can be used as binding material, although the latter can also be applied outside the round baler in a bale wrapper that is separate from said baler. After binding inside the pressing chamber, the bale is ejected. Only thereafter can the pressing chamber once again be used to form a new bale. Therefore, there is a significant period during which no harvested material can be processed. This normally means that harvested material intake must be interrupted for an equivalent period of time. This is to say; the round baler must stop for the binding and ejection process, which typically takes about one-third of the total operating time, thereby substantially reducing productivity.

Therefore, it has already been proposed in the prior art to provide an intermediate harvested material storage that is filled when no harvested material can be processed, and which storage is emptied during the next bale forming operation. The proposed solutions have, however, either not reached production maturity or have not been successful. In part, the underlying mechanisms are too complex.

Therefore, there is a strong need to have a baler that has a continuous intake of harvested material.

SUMMARY OF THE INVENTION

The following objects, features, advantages, aspects, and/or embodiments are not exhaustive and do not limit the overall disclosure. No single embodiment needs to provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

For this purpose, a round baler is created, comprising a feed channel leading to a pressing chamber, a drivable transfer device, which is configured to convey harvested material through the feed channel toward the pressing chamber in a pressing mode, as well as a storage device with a storage space for intermediate storage of harvested material.

The round baler is configured to press agricultural harvested material into round bales, wherein the actual pressing process takes place in a pressing chamber. The agricultural harvested material may be, in particular, stalk material such as grass, straw, or hay. The term "round baler" here expressly also includes machines which, in addition to a pressing of the harvested material into bales, also perform a binding and/or a wrapping of the bales. The harvested material can be picked up by an intake device, in particular a pick-up baler, and conveyed through the feed channel toward the pressing chamber. For conveying, the round baler may comprise at least one conveying device, for example, a conveying rotor or a cutting rotor, which not only conveys the harvested material along, but also cuts it. In all cases, the harvested material stream passes through the feed channel before reaching the pressing chamber. The feed channel is configured to guide the harvested material, wherein it does not necessarily need to be configured in an entirely closed manner.

The design of the pressing chamber is not specified in the framework of the invention. It may, therefore, be a pressing chamber of a fixed or a variable size. In the first case, the round baler may comprise a plurality of pressing rollers which are rotatable about axes of rotation which are stationary with respect to a frame. In the last case, the pressing chamber is at least partially defined by an endless pressing element that can be driven in rotation, wherein it may be one or a plurality of endless compression belts or straps or, for example, a chain bar conveyor.

The round baler comprises a transfer device, wherein this designation is not to be interpreted restrictively. In general, the transfer device, at least in pressing mode, serves to transfer harvested material to the pressing chamber by conveying it through the feed channel toward the pressing chamber. In this respect, the transfer device can also be regarded as a conveying device. The transfer device is drivable, wherein it is temporarily driven in pressing mode. The driving force can be generated mechanically, electrically, hydraulically, electrohydraulically, or in any other way. The pressing mode can also be referred to as the bale forming mode and characterizes that working mode of the round baler in which harvested material is successively conveyed to the pressing chamber, wherein a harvested material bale is formed and compressed.

In addition, the round baler comprises a storage device with a storage space for intermediate storage of harvested material. The storage space is therefore used to temporarily accommodate harvested material. As will be elucidated below, this is intended, in particular, for the time in which a bale of harvested material has been finished. Before the formation of the next bale can be started, the finished bale must be bound and ejected. Instead of interrupting the harvested material intake during this time, harvested material can be temporarily stored in the storage space of the storage device and once again be discharged for the formation of the next bale and be conveyed to the pressing chamber.

According to the invention, the storage device comprises a storage space wall which delimits the storage space to the outside, which is in communication with the feed channel by means of at least one storage space opening, as well as a drivable storage space conveyor for the revolving conveyance of harvested material within the storage space, wherein, in storage mode, the storage device is provided to intake harvested material from the feed channel by means of at least one storage space opening and, in the pressing mode, to discharge harvested material to the feed channel via at least one storage space opening.

The storage space wall is preferably rigid and fixed in position to a frame of the round baler. Here and in the following, "frame" refers to the part of the round baler that forms its basic structure and gives it overall rigidity. The wheels of the round baler are also connected to the frame by means of a suitable mounting bracket, as is a tow bar in the case of a towed design. In addition, the frame typically comprises a housing which shields the internal parts from the outside. The storage space wall is typically made of metal, for example, sheet steel. The storage space wall delimits the storage space to the outside and thus defines its outer dimensions, although this does not mean that the storage space wall surrounds the storage space completely, in particular without gaps. The storage space wall ensures that harvested material cannot escape uncontrolled from the storage space, although partial escape may be acceptable depending on the configuration.

The storage space is connected to the feed channel via at least one storage space opening. The respective storage space opening is preferably formed in the storage space wall. The connection to the feed channel does not need to be direct, which is to say, the feed channel does not need to connect to the storage space immediately beyond the storage space opening, but rather, a connecting channel could, for example, also be arranged in between. In any case, an exchange of harvested material between the feed channel and the storage space is possible through the at least one storage space opening. The respective storage space opening can be configured to be closable, but preferably it is permanently open. Preferably, precisely one storage space opening is provided.

Furthermore, the storage device comprises a drivable storage space conveyor, which is designed for the revolving conveyance of harvested material within the storage space. The storage space conveyor can be driven mechanically, electrically, hydraulically, electrohydraulically, or in other ways. It is configured to convey the harvested material in a revolving manner, which is to say, in the manner of an endless conveyor or a circular conveyor. On the whole, the harvested material is thus conveyed through the storage space on a closed ring-like path, although the exact path of movement of individual pieces of the harvested material may possibly not be closed. Since the storage space conveyor conveys the harvested material within the storage space, it is itself at least partially arranged in the storage space.

The storage device is provided to receive harvested material from the feed channel by means of at least one storage space opening in storage mode and to discharge harvested material to the feed channel by means of at least one storage space opening in one pressing mode. The storage mode could also be referred to as binding mode, ejection mode, or binding-and-ejection mode, as this mode can be selected while the harvested material bale is being bound and/or ejected, such that no harvested material can be conveyed to the pressing chamber. In this storage mode, it is provided that harvested material from the feed channel enters the storage space of the storage device by means of at least one storage space opening (preferably: the storage space opening). The harvest material can be temporarily stored there, whereas it is continuously conveyed by means of the storage space conveyor. When the binding and ejection process is finished, the pressing chamber can once again be conveyed with harvested material, and the round baler can switch back to pressing mode. The previously temporarily stored harvested material can then be delivered to the feed channel by means of at least one storage space opening (preferably: the storage space opening).

The round baler, according to the invention, may possibly enable uninterrupted harvested material intake, so that stopping to bind and/or eject the bale is unnecessary. Most importantly, this represents a time advantage, since the aforementioned operations take up a substantial portion of the total time required to provide a bale of harvested material (by way of example, about one-third, while the remaining two-thirds are required for bale formation). In some circumstances, energy consumption can also be reduced, as stopping, and restarting for each binding operation is no longer necessary. The configuration of the storage device with a storage space conveyor operating in the manner of an endless conveyor offers particular advantages. The harvested material can be introduced into the storage space at one point, in the area of a storage space opening, and is then immediately transported further by the storage space conveyor, thus creating, at this point, space for subsequent harvested material. If comparatively little harvested material is being conveyed at one point of the storage space conveyor, further harvested material can be added here after one rotation of the storage space conveyor, so that the storage space can successively be filled to optimum capacity. The storage space conveyor can be realized mechanically simply and with few moving parts, as will be explained hereinafter. In addition, the outer boundary of the storage space is preferably defined by a rigid storage space wall of fixed size. This storage space wall can form an abutment for compression of the harvested material by the storage space conveyor. It can be solidly built and without moving parts. When emptying the storage space, the self-contained conveyor path of the storage space conveyor is again advantageous, since harvested material can be discharged, which is to say, removed, at a point adjacent to the storage space opening, after which the storage space conveyor immediately transports further harvested material to this point. If not all of the harvested material at one point of the storage space conveyor has been removed, this can occur at the next turn. The harvested material can also be removed or delivered successively, for example, in layers.

There are various possibilities for the intake of harvested material into the storage space and/or discharge of harvested material from the storage space. It is conceivable that the storage device itself assists in at least one of these processes. A particularly preferred embodiment, on the other hand, provides, in storage mode, that the transfer device is set up, in storage mode, to guide harvested material out of the feed channel toward the storage space for intermediate storage and, in pressing mode, to take over harvested material discharged by the storage device and to convey it through the feed channel toward the pressing chamber. Which is to say, to some extent, the transfer device has a threefold function. Firstly, in pressing mode, it serves to assist, which is to say, in particular, to maintain, the "normal" harvested material flow (from the intake device) through the feed channel to the pressing chamber. Furthermore, in storage mode (active and/or passive), it guides harvested material toward the storage space, which includes the possibility that it guides it all the way into the storage space. In comparison with the pressing mode, it can be said that it at least partially, usually completely, diverts or redirects a harvested material intake flow coming from the intake device. It is thereby arranged in or on the harvested material flow in both modes. The third function consists in at least assisting in the emptying of the storage space, by having the transfer device take over harvested material from the storage space and conveying it through the feed channel toward the pressing chamber. During the pressing mode, the harvested material intake flow coming from the intake device and a harvested material storage flow coming from the storage space can at least temporarily combine to form a harvested material total flow, which is conveyed to the pressing chamber. Which is to say, the round baler is preferably set up, at least tempo-rarily, to combine a harvested material intake flow coming from an intake device with a harvested material storage flow coming from the storage device and to feed it to a harvested material total flow in the pressing mode and to feed this to the pressing chamber. The intake device (for example, a pick-up baler) is set up to pick up harvested material from a field and feed it to the feed channel.

Advantageously, the storage space conveyor comprises an inner part of the storage space conveyor with a conveyor wall that delimits the storage space inward and storage space tines that project from the inner part of the storage space conveyor toward the storage space wall. A drive force and/or a drive torque of the storage space conveyor generally acts on the inner part of the storage space conveyor, which, in turn, acts as a carrier for the storage space tines and moves them along. The conveyor wall of the inner part of the storage space conveyor is located opposite the storage space wall and, together with the latter, defines the storage space available to the harvested material. The storage space tines thereby form conveying elements, or alternatively, conveyor parts, that transfer the drive force of the storage space conveyor to the harvested material and drive it to move. It can also be said that the storage space tines push the harvested material ahead of them. As a rule, each storage space tine is configured in a rigid manner, although some elasticity is possible. Typically, the storage space tines are made of metal, for example, steel. The term "tine" is not to be interpreted restrictively in terms of shape. A typical construction form, however, provides that at least part of the storage space tines is flat, for example, made of sheet metal, wherein the narrow side of the tines points in the direction of movement. However, a metal sheet oriented in this way can also form a base section of the tine to which an attachment is connected, for example, welded. The attach-ment can, in turn, be formed by a sheet metal strip, the narrow side of which is oriented at an angle, for example, at a right angle to the direction of movement. In this embodi-ment, the attachment can, to a certain extent, shield the base section and protect it from wear. Moreover, the attachment and base section can stabilize each other mechanically, so that an overall sturdier storage space tine can be realized with less material.

To keep the construction of the storage space conveyor simple and sturdy, the storage space tine is preferably rigidly connected to the inner part of the storage space conveyor. Accordingly, the movement of the inner part of the storage space conveyor—apart from any elasticity of the storage space tine—is transmitted directly to the storage space tine.

In general, the storage space conveyor can be driven in a rotating manner, which in principle, allows different configurations and associated movement paths. A preferred configuration provides that the storage space conveyor can be driven in rotation about a storage space axis, wherein the storage space wall is configured at least predominantly rotationally symmetrical to the storage space axis. The storage space conveyor thus rotates about the storage space axis, which, by way of example, may run centrally through the above-mentioned inner part of the storage space con-veyor. It can thus also be referred to as a storage rotor. Inasmuch as the storage space conveyor is configured in a rigid manner, all parts and/or sections thereof move along circular paths about the storage space axis. This also applies, in particular, to the outermost points of the storage space tines, which can thus be guided past the storage space wall in close proximity if the storage space wall is also configured to be rotationally symmetrical to the storage space axis. In particular, the storage space wall can be cylindrical and/or cylindrical-shell-shaped, at least in sections, with the at least one storage space opening forming a cutout in the cylinder shell.

The storage space conveyor advantageously comprises a plurality of tine rings arranged axially and tangentially offset from one another with respect to the storage space axis, wherein each tine ring has a plurality of storage space tines arranged tangentially offset from one another. The storage space tines assigned to a tine ring normally have identical or only slightly different axial positions relative to the storage space axis. The number of storage space tines in a tine ring can be individually selected, normally, between 3 and 10 storage space tines are provided per tine ring. A plurality of tine rings is provided, each of which usually comprises the same number of storage space tines. The tine rings are axially offset from one another. In addition, the tine rings are tangentially offset from each other, which means that the tines of different tine rings have different tangential posi-tions with respect to the storage space axis. The latter can, in particular, have the advantage that tines offset in this way normally interact with a certain amount of harvested mate-rial at different times during rotation, by way of example, by piercing the harvested material. In this way, briefly occur-ring force and/or torque peaks can be avoided. In particular, in the case of a large number of tine rings, it is possible that the storage space conveyor, despite the described tangential offset, also comprises pairs or groups of tine rings that are not offset from one another. However, these only make up a small part of the total number of tine rings.

Preferably, axial intermediate spaces are formed between adjacent tine rings to allow the transfer device to engage the storage space. Which is to say, adjacent tine rings are spaced apart in the axial direction relative to the storage space axis to such an extent that an intermediate space is formed between them. This intermediate space then extends tangen-tially around the storage space axis. With a suitable con-figuration, the transfer device can engage in this intermedi-ate space, which is arranged inside the storage space, without the transfer device colliding with the storage space conveyor during its rotation. By engaging in the storage space, the transfer device can, on the one hand, better introduce harvested material into the storage space, while on the other hand, it can also better convey harvested material out of the storage space. This is particularly advantageous if, as mentioned above, the transfer device comprises a transfer rotor, the transfer tines of which can then engage in the intermediate spaces.

Preferably, the round baler is configured to drive the storage space conveyor continuously in a constant storage space conveyor direction both in pressing mode and in storage mode. This is to say, the storage space conveyor is not stopped, nor is there a reversal of the drive direction, in the case of a rotatory driven storage space conveyor, which is to say, the direction of rotation. Correspondingly, this simplifies the control of the storage space conveyor and also the transmission of a driving force to it. A motor, as well as, if necessary, existing means of power transmission may always operate in one direction. In addition, in the case of storage space tines, one conveying side can be defined, which is always at the front in the storage space conveyor direction and can therefore be adapted in terms of rigidity and shape.

Furthermore, the round baler may be configured to drive the storage space conveyor continuously at a constant speed. The actual speed of the storage space conveyor can also exhibit fluctuations in this embodiment, which fluctuations are usually limited (for example, less than 10% or less than 5%). Such fluctuations can, for example, be caused by different capacity utilization of the storage space conveyor or by the fact that not enough drive power is available in the meantime, as this is shared between the storage space conveyor and other components of the round baler. On the part of the round baler, by way of example, on the part of a control unit thereof, it is, however, provided that the speed, for example, the rotational speed, remains the same. This further simplifies the control and the generation and/or transmission of the driving force for the storage space conveyor.

One embodiment provides that the storage space tines have a backward pitch on a conveying side, so that the edge of the storage space tine recedes tangentially radially outward. In this, the conveying side corresponds in the tangential direction to the side that, in the operating state, lies continuously or at least most of the time in the direction of movement of the storage space tine. The terms "forward pitch" and "backward pitch" refer respectively to a pitch relative to the axial-radial plane. A backward pitch refers to a pitch, the edge of which, as described, recedes tangentially toward the outside (which is to say, toward a radially outer end). A forward pitch would accordingly be one the edge of which projects tangentially outward. This is always related to the direction in which the respective edge points tangentially, which is to say, in this case, the direction of movement of the storage space tines. Without being limited to this, this configuration is particularly advantageous in combination with a transfer device that has a transfer rotor with transfer tines. The receding shape particularly favors the conveying out and/or combing out of harvested material between the storage space tines.

It is also preferred that the storage space tines on a rear side opposite the conveying side have a smaller pitch than on the conveying side. This again refers to the direction in which the respective edge points tangentially, which is to say, in this case, against the direction of movement of the storage space tines. The pitch on the rear side can be a lesser backward pitch or a forward pitch, which is, however, less pronounced. This also includes the possibility that the pitch is zero, which is to say, the rear side of the storage space tine runs parallel to the axial-radial plane. Once again, without being limited to this, this configuration is particularly advantageous in combination with a transfer device that has a transfer rotor with transfer tines. In this case, the low pitch favors the inward conveying or pushing in of harvested material into the intermediate spaces between the storage space tines.

Whereas the storage space wall is preferably configured in a rigid manner, there are two options for the conveyor wall, which respectively have their own advantages. According to a first option, the conveyor wall is configured to be rigid overall so that it forms a fixed boundary of the storage space with constant dimensions. In this case, the storage space conveyor is generally simply and sturdily constructed. According to another embodiment, the conveyor wall is at least partially elastically deflectable, whereby the size of the storage space is variable. At least parts of the conveyor wall are elastically deflectable inwards, which is to say, away from the storage space wall, so that, at least locally, the distance between storage space wall and conveyor wall can be increased. On the one hand, the conveyor wall could be configured to be inherently elastic. On the other hand, inherently rigid parts of the conveyor wall could be elastically mounted and/or suspended. The elastic deflectability can complicate the construction of the storage space conveyor. Therefore, it can, however, be advantageous if elastic restorative forces act on the harvested material in the storage space via the conveyor wall. On the one hand, this can possibly achieve more uniform compaction of the harvested material between the conveyor wall and the outer wall. It is also possible that the elastic restorative forces in pressing mode actively push the harvested material out of the storage space through the at least one storage space opening and thereby assist in the emptying of the storage space.

There are various possibilities with regard to the arrangement of the storage device relative to the feed channel. It should, however, be borne in mind that the feed channel of round balers is normally located far down, corresponding to the positions of the intake device as well as of the entrance to the pressing chamber. An arrangement of the storage device below the feed channel would therefore mean a significant redesign of the latter. An arrangement to the side of the feed channel is hardly possible since the installation space is insufficient for this due to a reasonable maximum width of the round baler. It is therefore preferred that the storage device is arranged at least predominantly above the feed channel. This statement refers to the vertical direction in a state in which the round baler is set up in the intended manner. It is thereby possible that parts of the storage device, with respect to the vertical direction, are at the same level as parts of the feed channel or are even arranged lower. However, the major portion of the storage device is arranged higher than the feed channel. It is also preferred that the storage space opening points at least partially downwards, which is to say, borders a lower part of the storage space. If a storage space axis can be defined as described above, the at least one storage space opening is preferably arranged lower than the storage space axis. This can also be advantageous in that the discharge of harvested material from the storage space is assisted by gravity.

One embodiment provides that the feed channel has a guide bottom section arranged upstream of the transfer device in the harvested material flow direction and inclined upwardly toward at least one storage space opening. The guide bottom section forms a guide element, so to speak, through which the harvested material is directed toward the storage space opening. This measure can, for example, have the effect that, in storage mode, only a lesser (or possibly no) drive force is required on the part of the transfer device in order to direct the harvested material intake flow toward the storage space opening. Conversely, in pressing mode, the driving force of the transfer device is necessary to direct the harvested material intake flow (as well as the harvested material storage flow) away from the storage space opening and toward the pressing chamber. The corresponding guide bottom section is normally rigidly connected to the frame of the round baler, although it would, in principle, be conceivable for it to be adjustably arranged on the frame in order to influence the direction of the harvested material flow.

Since it is hardly possible to change the time for binding and/or ejecting a finished harvested material bale, the storage space can be filled to different extents during this time, depending on how much harvested material the round baler picks up during this time and feeds to the storage device. This, in turn, depends on the one hand on the amount of harvested material available in the field for a particular travel distance (which is to say, the harvested material density), and on the other hand, on the travel speed of the round baler, which can be selected differently within certain limits. Since the storage space cannot be dimensioned as large as desired, depending on the design, the storage space can potentially become overfilled, which is to say, it can no longer hold any more harvested material before the harvested material bale has been ejected. Advantageously, the round baler is therefore set up to detect overfilling of the storage space and to then automatically, at very least, reduce a harvested material intake flow supplied to the storage device. The harvested material intake flow coming from the intake device is to be, at very least, reduced, which includes the possibility that it is completely stopped. This normally means that temporarily less or even no harvested material is taken up. This, in turn, can be realized by reducing the travel speed of the round baler, possibly bringing it to zero. In the case of a towed round baler without its own drive mechanism, the round baler can send a signal to the tractor, which leads to a reduction in travel speed. The overfilling of the storage space can be detected, for example, by a drive force and/or a drive torque of the storage space conveyor that permanently exceeds a predefined limit value. It would also be conceivable to provide at least one force and/or pressure sensor in the storage space wall and/or in the conveyor wall.

The invention further provides a storage device for a round baler, with a storage space for intermediate storage of harvested material. According to the invention, the storage device has a storage space wall which delimits a storage space to the outside, at least one storage space opening for connecting the storage space to a feed channel leading to a pressing chamber of the round baler, as well as a drivable storage space conveyor for rotating harvested material within the storage space, wherein, in a storage mode, the storage device is provided for receiving harvested material from the feed channel via at least one storage space opening and, in the pressing mode, for discharging harvested material to the feed channel via at least one storage space opening.

The terms mentioned have already been elucidated in connection with the round baler according to the invention and will, therefore, not be explained again. Advantageous embodiments of the storage device according to the invention, correspond to those of the round baler according to the invention.

It is expressly pointed out that the above-described embodiments of the invention can be combined in each case individually, but also in any combinations with one another, with the subject matter of the main claim, provided that no technically compelling obstacles are in conflict therewith.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a)

combinations of disclosed aspects and/or embodiments and/or (b) reasonable modifications not shown or described.

Further modifications and embodiments of the invention can be derived from the following description of the subject matter and the drawings.

The invention is now to be explained in more detail with reference to exemplary embodiments.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

In the drawings.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
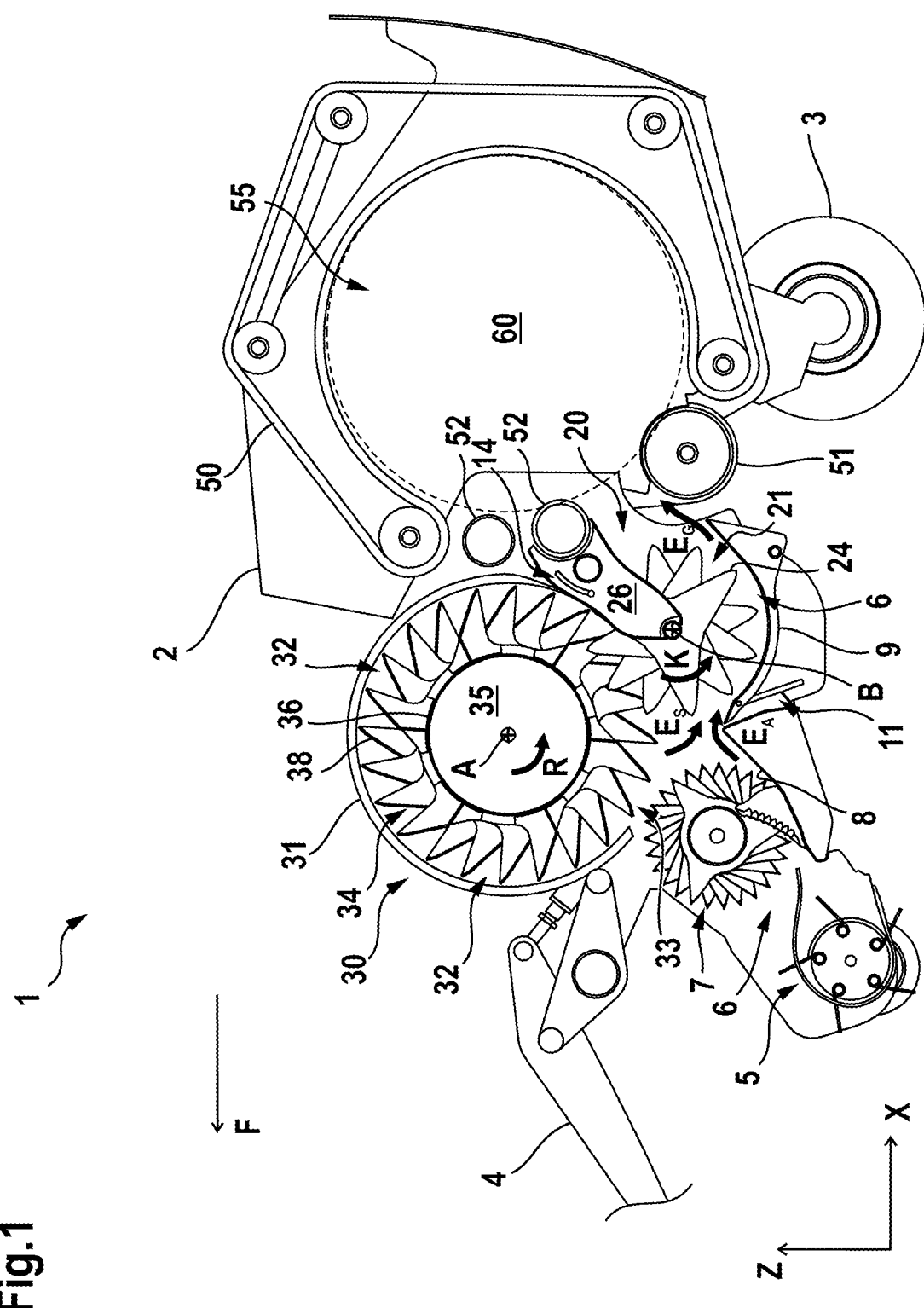
FIG. 1 shows a side view of a cross-sectional representation of a round baler according to the invention, with a first embodiment of a storage device according to the invention, in a pressing mode.

FIG. 1 shows a round baler 1 according to the present invention. A longitudinal axis X of the round baler 1 points backward against the direction of travel F and a vertical axis Z points upwards. Wheels 3 are rotatably mounted on a frame 2 of the round baler 1, on which wheels the round baler 1 stands. In a known manner, the round baler 1 is intended to be pulled by a tractor unit, in particular an agricultural tractor (not shown), for which purpose it comprises a tow bar 4. However, the invention is not limited to towed or borne round balers 1, but rather also includes self-propelled round balers 1. A pick-up baler 5 can be seen at the front in the direction of travel F, which pick-up baler rotates clockwise during operation (with reference to FIG. 1). It is used to pick up harvested material, more precisely stalk material such as straw, hay or grass, from the ground and to convey it as a harvested material intake flow $E_A$ further into a feed channel 6, which leads to a pressing chamber 55. From the pick-up baler 5, the harvested material passes through the feed channel 6 to a cutting rotor 7, which rotates in a counterclockwise direction. It comprises a plurality of tines which grip the harvested material, cut it in cooperation with fixed knives (no reference sign), and transport it further, counter to the direction of travel F and slightly upward through the feed channel 6. Instead of the cutting rotor 7, a conveyor rotor could also be used, which solely conveys the harvested material and does not comminute it.

Figure 2:
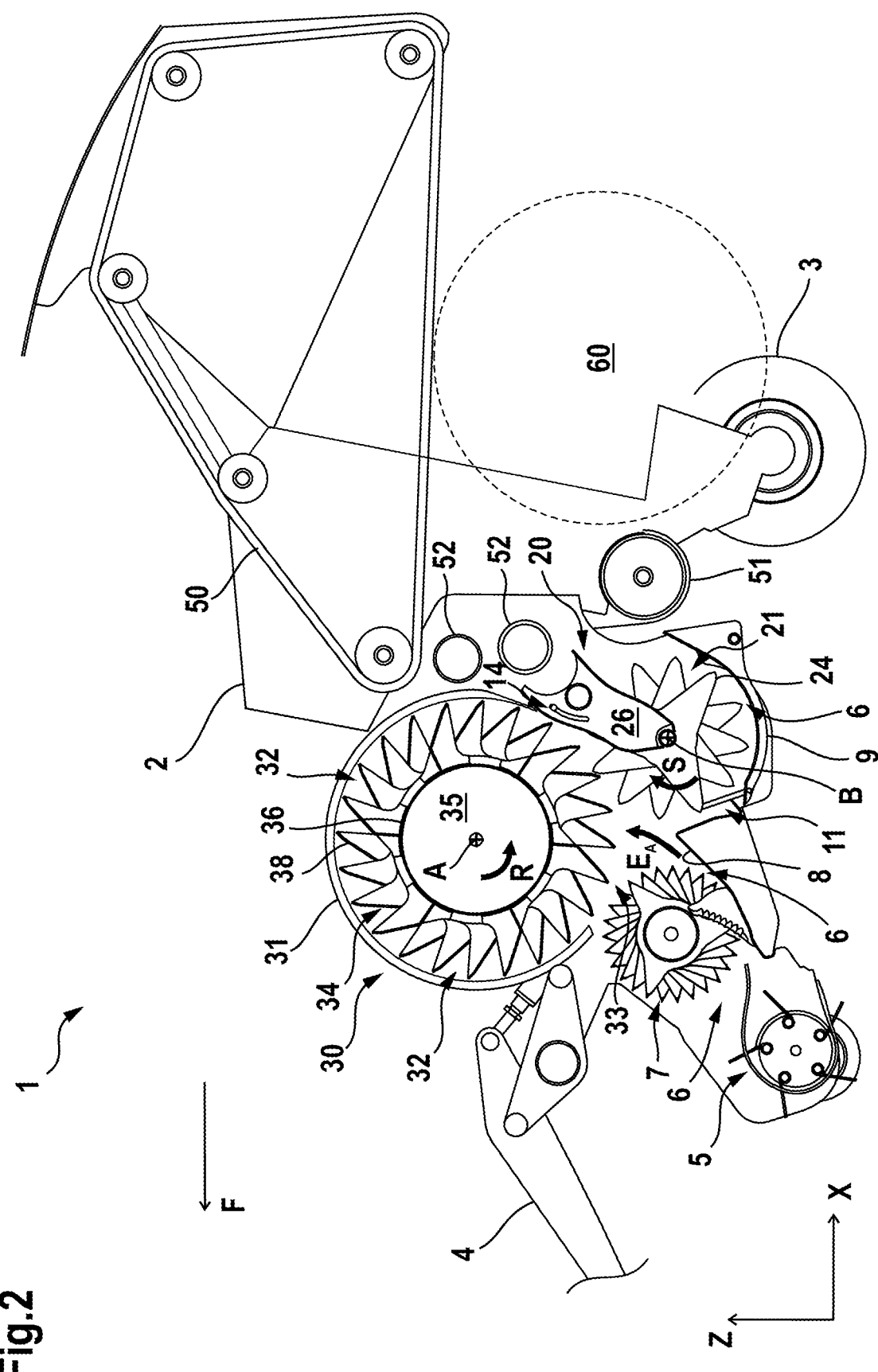
FIG. 2 shows a side view of a cross-sectional representation of the round baler of FIG. 1, in a storage mode.

On the way to the pressing chamber 55, the harvested material intake flow $E_A$ passes an upwardly inclined guide bottom section 8 below a storage space opening 33. A storage device 30 connects above the storage space opening 33, which storage device comprises a storage space wall 31, which outwardly delimits a storage space 32. The storage space wall 31 is configured predominantly rotationally symmetrical to a storage space axis A. The storage space 32 communicates with the feed channel 6 by means of the storage space opening 33. A storage space conveyor 34 in the form of a storage rotor can be driven in rotation about the storage space axis A. The storage space conveyor 34 exhibits a predominantly cylindrical inner part 35 of the storage space conveyor with a conveyor wall 36 inwardly delimiting the storage space or chamber 32. A plurality of storage space tines 38 project from the inner part 35 of the storage space conveyor 34 toward the storage space wall 31. The structure of the storage space conveyor 34 and of the storage space tines 38 can be better recognized in FIG. 3 through FIG. 5. The storage space tines 38 are grouped in storage space tine rings 37a-37d, which rings are axially spaced with respect to the storage space axis A and tangentially offset. In the present example, each storage space tine ring 37a-37d comprises six storage space tines 38, and axially adjacent storage space tine rings 37a-37d are each tangentially offset by 15°. Axial intermediate spaces 41 are formed between adjacent storage space tine rings 37a-37d. The individual storage space tines 38 comprise a radially tangential base section 39 and an axially extending attachment 40 connected thereto, both of which can be made of sheet steel. As indicated in FIG. 1 and FIG. 2, the storage space conveyor is driven in a storage space conveyor direction R (counterclockwise in the figures). With respect to the storage space conveyor direction R, a front conveying side 38.1 of the storage space tine 38 exhibits a backward pitch, which is to say, the edge of the respective storage space tine 38 recedes tangentially radially outward. In the example shown, the pitch relative to the radial direction is approximately 29°. On a rear side 38.2 opposite the conveying side 38.1, however, the storage space tines 38 have no pitch, which is to say, they run radially.

The harvested material stream then passes through an arc-shaped rotor bottom section 9, wherein it is conveyed by a transfer rotor 21. The transfer rotor 21 is part of a transfer device 20, and is rotatably mounted on a rotor arm 26, which is adjustable relative to the frame 2, more precisely, it can be driven about a transfer axis B running parallel to the transverse axis Y. The rotor arm 26 respectively forms a stripper on both sides for the transfer rotor 21. In the area of the transfer rotor 21, the rotor arm 26 is adjustably guided along a circular path, which is centered on the axis of the cutting rotor 7. In an area spaced apart from the transfer rotor 21, the rotor arm 26 is guided in an arc-like manner relative to the frame 2 by means of a first slotted guide 11, and this in such a way that it is always guided closely along the edge of the storage space wall 31, which delimits the storage space opening 33. It thus forms an extension of the storage space wall 31. The adjustment of the rotor arm 26 is carried out by an actuator not shown here. The transfer rotor 21 comprises a shaft 22 to which a plurality of transfer tine rings 23a-23c are attached. Each transfer tine ring comprises a plurality of transfer tines 24, in this example, respectively three which are arranged tangentially offset with respect to the transfer axis B. As can be easily seen in the synopsis of FIG. 3 through FIG. 5, adjacent transfer tine rings 23a-23c are axially spaced and tangentially offset from one another, in this case, respectively by 30°. The transfer tines 24 have a greater backward pitch on a storage feed side 24.1 that lies in the front in the storage space feed direction S than on a chamber feed side 24.2 lying in front in chamber feed direction A. In the present example, the pitch on storage feed side 24.1 is about 20° with respect to the radial direction, whereas on the opposite chamber feed side 24.2 it is only about 17°.

Figure 3:
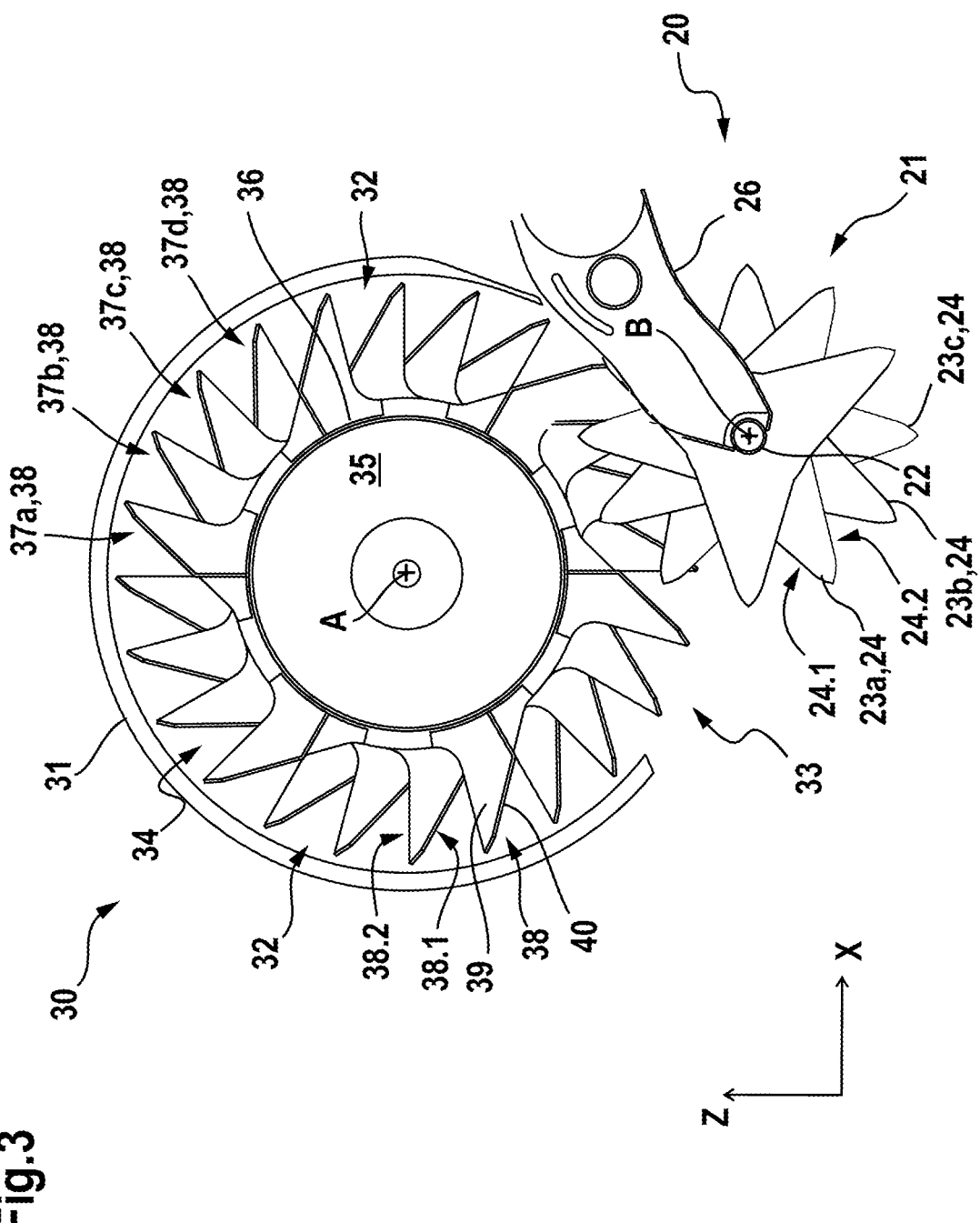
FIG. 3 shows a side view of the storage device as well as of a transfer device of the round baler of FIG. 1.
Figure 4:
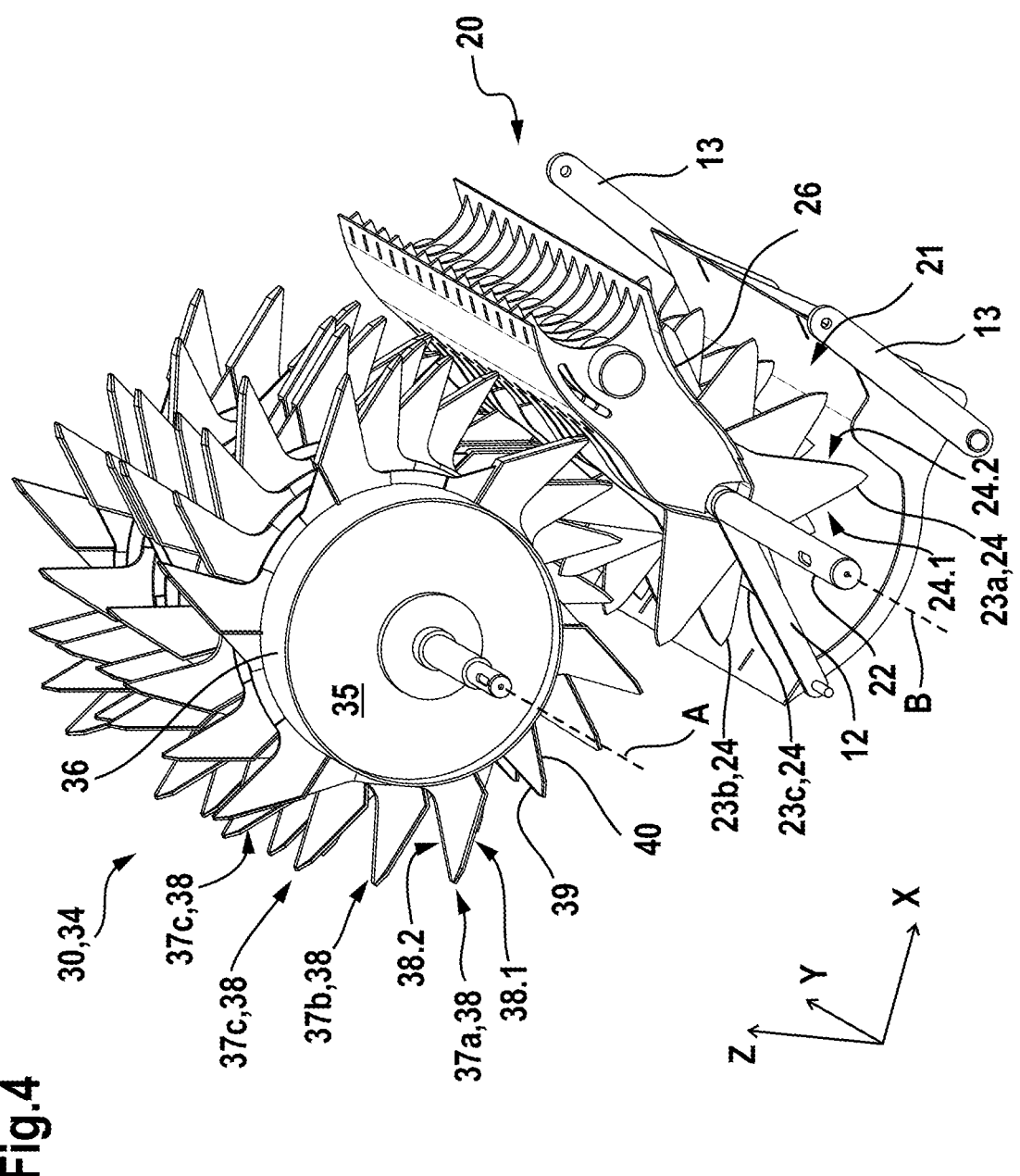
FIG. 4 shows a perspective representation of the storage device as well as of the transfer device of FIG. 3.
Figure 5:
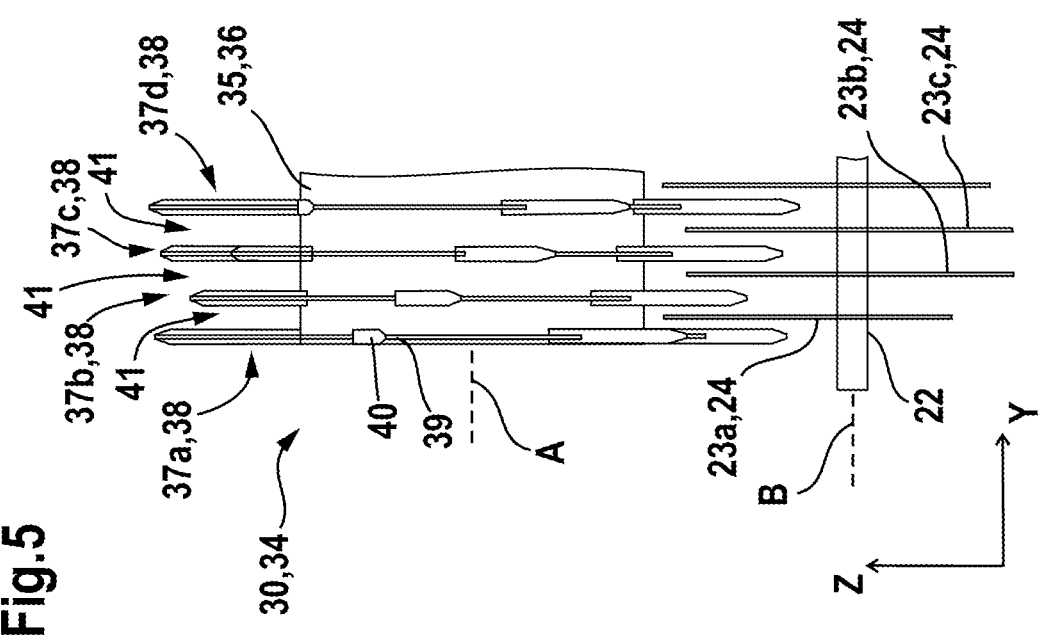
FIG. 5 shows a rearward view of the storage device as well as of the transfer device of FIG. 3.

FIG. 1, as well as FIG. 3 through FIG. 5, show a condition in which the rotor arm 26 is positioned relative to the frame 2 in such a way that the transfer rotor 21 engages with the transfer tines 24 in the axial intermediate spaces 41 and thereby through the storage space opening 33 into the storage space 32. A front area of the arc-shaped rotor bottom section 9 is guided by means of a second slotted guide 14 on the frame 2, and there it is connected to the shaft 22 via first coupling struts 12, wherein the shaft is free to rotate relative to the first coupling struts 12. In this way, the front section, guided by the second slotted guide 14, moves up and down synchronously with the shaft 22, ensuring an at least approximately constant distance between the arc-shaped rotor bottom section 9 and the transfer tines 24. In this way, the transfer tines 24 can move across the arc-shaped rotor bottom section 9 at a comparatively small distance and thus optimally grip the harvested material in the feed channel 6.

In the pressing chamber 55, the actual bale formation and the pressing of the harvested material into a harvested material bale 60 take place. For this purpose, a starter roller 51, two pressing rollers 52, and a plurality of endless press elements 50 (in this case, press belts) (arranged next to each other perpendicular to the drawing plane) are provided, which define the pressing chamber 55 and allow for a variable size of the same. Instead of the press belts, a chain bar conveyor could, however, also, for example, be used, or it could also be a pressing chamber 55 of fixed size that is provided. The starter roller 51 is adjustable relative to the frame 2 to allow the cross-section of the access to the pressing chamber 55 to be increased if required. A rear portion of the arc-shaped rotor bottom section 9 is connected to the axis of the starter roller 51 by means of second coupling struts 13 so that it follows its movement when it is adjusted.

FIG. 1 shows the round baler 1 in a pressing mode, in which mode the transfer rotor 21 conveys the harvested material through the feed channel 6 toward the pressing chamber 55. In the pressing mode, the transfer rotor 21 rotates in a chamber feed direction K, counterclockwise with respect to FIG. 1. In so doing, a harvested material storage flow $E_S$ coming from the storage device 30 combines with the harvested material intake flow $E_A$ to form a harvested material total flow $E_G$, which gets conveyed to the pressing chamber 55. A condition is shown in which the harvested material bale 60 has reached its predetermined size, wherein the harvested material storage flow $E_S$ can also be reduced to nil, since the storage device 30 is emptied. Subsequently, the harvested material bale 60 must be provided with binding material by means of a binding device not shown here and then ejected from the pressing chamber 55. During this period, no harvested material can be processed in the pressing chamber 55. Therefore, the round baler 1 switches to a storage mode, which is shown in FIG. 2. The essential point here is that the transfer rotor 21 changes the direction of rotation and is now driven in a storage space feed direction S, which is to say, clockwise with reference to FIG. 2. The harvested material intake flow $E_A$ coming from the pick-up baler 5 and the cutting rotor 7 is thus no longer forwarded toward the pressing chamber 55, but rather upward through the storage space opening 33 into the storage space 32. The said movement is assisted by the upward pitch of the guide bottom section 8.

At the beginning of the storage mode, the transfer device 20 is in a position corresponding to FIG. 1. This allows the transfer tines 24 to engage far into the storage space 32 and thus transport the harvested material to an area close to the conveyor wall 36. In the further course, the transfer rotor 21 can successively be moved out of the storage space 32, whereas the storage space 32 is filled from the inside to the outside. In this, the pitch of the storage space tines 38 on the rear side 38.2 is matched to the pitch of the transfer tines 24 on one storage feed side 24.1 that lies in the front in the storage space feed direction S, so that the transfer tines 24 can push the harvested material alongside the storage space tines 38 into the storage space 32. The adjustment of the transfer device 20 is continued until the transfer tines 24 no longer or only insignificantly engage in the intermediate spaces 41, as shown in FIG. 2.

A control unit of the round baler 1 that is not shown here verifies, in storage mode, whether there is eventually an overfilling of the storage space 32. For this purpose, a torque, with which the storage space conveyor 34 must be driven, may be monitored. A sudden marked increase of the torque points to an overfilling. Alternatively, a spring-loaded sensing element could be provided on the storage space wall 31, which is deflected by the harvested material when the storage space 32 is overfilled. If overfilling is detected, the round baler can be stopped automatically, interrupting the harvested material intake flow $E_A$ on the pick-up baler 5 side. However, the storage space 32 is sized in such a way to normally accommodate harvested material until the harvested material bale 60 has been tied and can be ejected, as shown in FIG. 2.

As the pressing chamber 55 is now ready to form a new harvested material bale 60, the round baler again changes to pressing mode, for which the transfer rotor 21 is again driven in chamber feed direction K. At the beginning of the pressing mode, the position of the transfer device 20 corresponds approximately to FIG. 2, so that the transfer tines 24 engage only slightly or not at all into the storage space 32. In this way, the storage transfer rotor 21 is prevented from needing to convey out too large a quantity of harvested material in opposition to the conveying movement of the storage space conveyor 34 that continues in a continuous manner. Initially, only a thin, radially outermost layer with respect to the storage space axis A is collected. The harvested material from this layer is conveyed downward through the storage space opening 33 into the feed channel 6 and further along the arc-shaped rotor bottom section 9 to the pressing chamber 55. The harvested material storage flow $E_S$ coming from the storage space 32 combines with the harvested material intake flow $E_A$ coming from pick-up baler 5 and cutting rotor 7 to form a harvested material total flow $E_G$. In order to empty the storage space 32 quickly and also to be able to efficiently guide the combined harvested material flows to the pressing chamber 55, the transfer rotor 21 operates at a higher speed than in storage mode, for example, 100 rpm, normally between 80 and 150 rpm. As a rule, the transfer tines 24 should thereby achieve a conveying speed of at least 3 m/s. During outbound conveying, the conveying sides 38.1 of the storage space tines 38, as well as chamber feed sides 24.2 of the transfer tines 24, which are opposite the storage feed sides 24.1, act against each other on the harvested material between them. The backward pitch on the front side 38.1 is greater than that on the chamber feed side 24.2, which is to say, these are coordinated so that the harvested material can be conveyed out instead of being pushed back into the storage space 32. In the course of the pressing mode, the transfer device 20 is again successively adjusted so that the transfer rotor 21 gradually engages further into the storage space 32, wherein the stored harvested material is successively collected from the outside to the inside. As described above, the arc-shaped rotor bottom section 9 follows all adjustment operations of the storage space rotor 21, so that an approximately constant distance to the storage space rotor 21 results. In the rearward area of the rotor bottom section 9, it is also possible that a greater distance be set, for example, at the start of the pressing mode, in order to be able to more efficiently convey the overall greater harvested material total flow $E_G$. For this, the starter roller 51 is lowered, which brings about a synchronous lowering of the rear area of the rotor bottom section 9.

The transfer rotor 21, in storage mode, is driven at a lower speed in storage space feed direction S, whereas, in pressing mode, it is driven at a higher speed in chamber feed direction K. The necessary direction reversal is performed, whereas the storage space tines 24 do not engage into the storage space 32. In contrast, the storage rotor or storage space conveyor 34 is driven continuously at constant speed in storage conveyor direction R, which greatly simplifies its control, as well as the overall control of the round baler 1.

Figure 6:
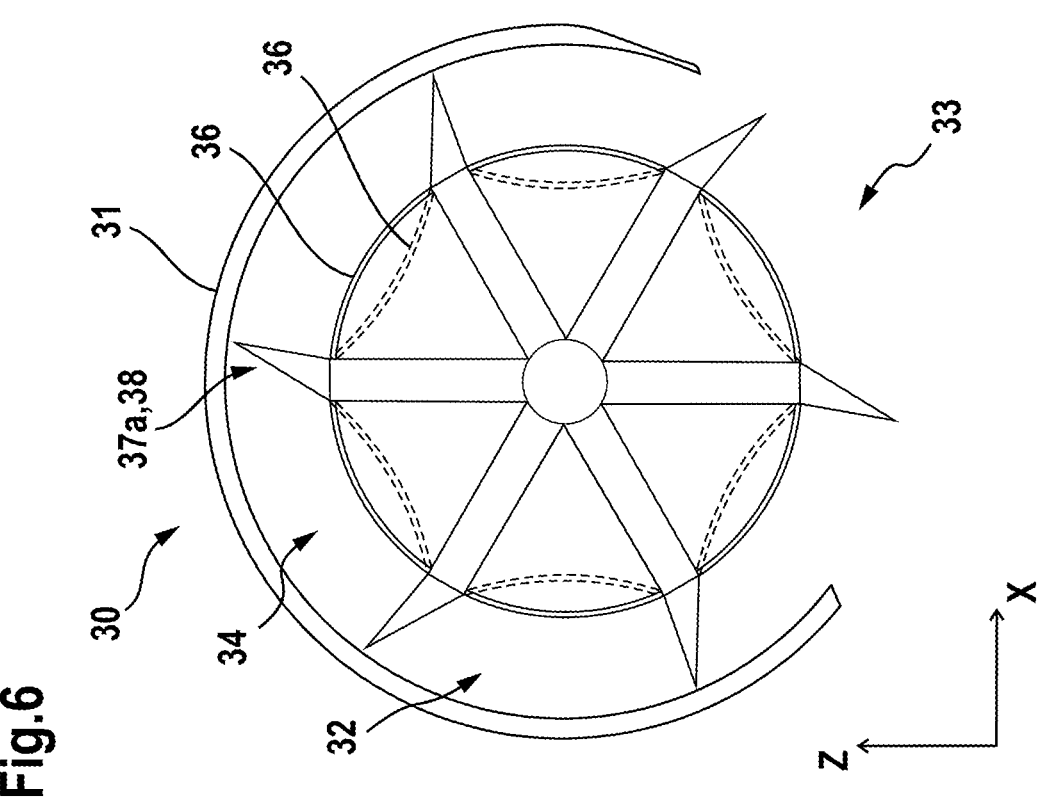
FIG. 6 shows a side view of the second embodiment of a storage device according to the invention.

FIG. 6 shows a second embodiment of a storage device 30 according to the invention, which does not differ from the first embodiment with respect to the storage space wall 31 as well as to the storage space opening 33. However, the storage space conveyor 34, which is once again configured as a storage space rotor that is rotatable about the storage space axis A, is not provided with a rigid conveyor wall 36. Rather, individual segments of the conveyor wall 36 can be elastically deflected in a radially inward direction, as indicated by the dashed line. This allows for an optional increase in the volume of the storage space or chamber 32 as it fills. In contrast, the storage space tines 38, of which only a first tine ring 37a is shown here for simplicity, are mounted fixed in position relative to one another and cannot be deflected. In this example, a section of the conveyor wall 36 arranged tangentially between two storage space tines 38 of a tine ring 37a-37d is respectively deflectable. However, various modifications would also be conceivable, for example, that a section arranged axially between two tine rings 37a-37d is elastically deflectable. In order to detect overfilling of the storage space 32, a deflectable section could be coupled to a sensor element. The invention is not limited to the above-described exemplary embodiment. A person skilled in the art can modify the exemplary embodiment in a manner, which appears suitable by using the available specialist knowledge in order to adapt it to a specific application.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| List of Reference Characters | |
| --- | --- |
| 1 | Round baler |
| 2 | Frame |
| 3 | Wheels |
| 4 | Tow bar |
| 5 | Pick-up baler |
| 6 | Feed channel |
| 7 | Cutting rotor |
| 8 | Guide bottom section |
| 9 | Arc-shaped rotor bottom section |
| 11 | First slotted guide |
| 12 | First coupling struts |
| 13 | Second coupling struts |
| 14 | Second slotted guide |
| 20 | Transfer device |
| 21 | Transfer rotor |
| 22 | Shaft |
| 23a-c | Transfer tine rings |
| 24 | Transfer tines |
| 24.1 | Storage feed side of transfer tines |
| 24.2 | Opposite feed side of tranfer tines |
| 26 | Rotor arm |
| 30 | Storage device |
| 31 | Storage space wall |
| 32 | Storage space |
| 33 | Storage space opening |
| 34 | Storage space conveyor |
| 35 | Cylindrical inner part |
| 36 | Conveyor wall |
| 37a-d | Storage space tine rings |
| 38 | Storage space tines |
| 38.1 | Front conveying side of storage space tine |
| 38.2 | Back conveying side of storage space tine |
| 39 | Radially tangential base section |
| 40 | Axially extending attachment |
| 41 | Axial intermediate spaces |
| 50 | Endless press elements |
| 51 | Starter roller |
| 52 | Two pressing rollers |
| 55 | Pressing chamber |
| 60 | Harvested material bale |
| A | Storage space axis |
| B | Transfer axis B |
| $E_A$ | Harvested material intake flow |
| $E_G$ | Harvested material total flow |
| $E_S$ | Harvested material storage flow |
| F | Direction of travel |
| K | Feed direction |
| R | Storage space conveyor direction |
| S | Storage space feed direction |
| X | Longitudinal axis |
| Y | Transfer axis Y |
| Z | Vertical axis |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein, refers to slight variations in numerical quantities with respect to any quantifiable variable. Inadvertent error can occur, for example, through the use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes a structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The invention claimed is:

1. A round baler (1) comprising of:
a feed channel (6) leading to a pressing chamber (55), a drivable transfer device (20) which is configured to convey harvested material through the feed channel (6) toward the pressing chamber (55) in a pressing mode; and
a storage device (30) with a storage space (32) for intermediate storage of harvested material, wherein the storage device (30) includes a storage space wall (31) which outwardly delimits the storage space (32), which is in communication with the feed channel (6) by means of at least one storage space opening (33), as well as a drivable storage space conveyor (34) for the revolving conveyance of harvested material within the storage space (32), wherein, in a storage mode, the storage device (30) is provided to intake harvested material from the feed channel (6) by means of at least one storage space opening (33) and, in the pressing mode, to discharge harvested material to the feed channel (6) via at least one storage space opening (33);
wherein the round baler is configured to drive the drivable storage space conveyor (34) continuously in a constant storage space conveyor direction (R) both in pressing mode and in storage mode.

2. The round baler (1) according to claim 1, wherein the drivable transfer device (20) is set up, in the storage mode, to guide harvested material out of the feed channel (6) toward the storage space (32) for intermediate storage and, in the pressing mode, to take over harvested material discharged by the storage device (30) and to convey it through the feed channel (6) toward the pressing chamber (55).

3. The round baler (1) according to claim 1, wherein the drivable storage space conveyor (34) comprises an inner part (35) of the storage space conveyor with a conveyor wall (36) that delimits the storage space (32) inward and storage space tines (38) that project from the inner part (35) of the drivable storage space conveyor (34) toward the storage space wall (31).

4. The round baler (1) according to claim 1, wherein the drivable storage space conveyor (34) can be driven in rotation about a storage space axis (A), wherein the storage space wall (31) is configured at least predominantly rotationally symmetrical to the storage space axis (A).

5. The round baler (1) according to claim 1, wherein the drivable storage space conveyor (34) includes a plurality of tine rings (37*a*-37*d*) arranged axially and tangentially offset from one another with respect to a storage space axis (A), each tine ring (37*a*-37*d*) having a plurality of storage space tines (38) arranged tangentially offset from one another.

6. The round baler (1) according to claim 5, further comprising axial intermediate spaces (41) that are formed between adjacent tine rings (37*a*-37*d*) to allow the drivable transfer device (20) to engage the storage space.

7. The round baler (1) according to claim 1, further comprising storage space tines (38) having a backward pitch on a conveying side (38.1), so that the edge of the storage space tine (38) recedes tangentially radially outward.

8. The round baler (1) according to claim 7, further comprising storage space tines (38) on a rear side (38.2) opposite the conveying side (38.1) having a smaller pitch than on the conveying side (38.1).

9. The round baler (1) according to claim 1, further comprising a conveyor wall (36) is at least partially elastically deflectable, whereby the size of the storage space (32) is variable.

10. The round baler (1) according to claim 1, wherein the storage device (30) is arranged at least predominantly above the feed channel (6).

11. The round baler (1) according to claim 1, wherein the feed channel (6) includes a guide bottom section (8) arranged upstream of the drivable transfer device (20) in a harvested material flow direction and inclined upwardly toward the at least one storage space opening (33).

12. The round baler (1) according to claim 1, wherein the round baler is configured to drive the drivable storage space conveyor (34) continuously at constant speed.

13. The round baler (1) according to claim 1, wherein the round baler is configured to detect an overfilling of the storage spaces (32) and thereinafter automatically at least reduce a harvested material flow.

14. A storage device (30) for a round baler (1), comprising:

a storage space (32) for intermediate storage of harvested material, wherein the storage device has a storage space wall (31) which delimits the storage space (32) to the outside, at least one storage space opening (33) for connecting the storage space (32) to a feed channel (6) leading to a pressing chamber (55) of the round baler (1); and a drivable storage space conveyor (34) for rotating harvested material within the storage space (32), wherein, in a storage mode, the storage device (30) is provided for receiving harvested material from the feed channel (6) via at least one storage space opening (33) and, in a pressing mode, for discharging harvested material to the feed channel (6) via at least one storage space opening (33);

wherein the round baler is configured to drive the drivable storage space conveyor (34) continuously in a constant storage space conveyor direction (R) both in pressing mode and in storage mode.

*    *    *    *    *